(12) United States Patent
Chalk et al.

(10) Patent No.: US 12,353,041 B2
(45) Date of Patent: Jul. 8, 2025

(54) INTERMITTENTLY BONDED RIBBON WITH INTERMITTENT BONDS CREATED WITH A WET-ON-WET PROCESS

(71) Applicant: CORNING RESEARCH & DEVELOPMENT CORPORATION, Corning, NY (US)

(72) Inventors: Julie Ann Chalk, Hickory, NC (US); David Wesley Chiasson, Edmonton (CA); Klaus Hartkorn, Painted Post, NY (US); Gregory Alan Mills, Clemmons, NC (US); Xiaomin Zhao, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 248 days.

(21) Appl. No.: 18/109,440

(22) Filed: Feb. 14, 2023

(65) Prior Publication Data

US 2023/0185047 A1 Jun. 15, 2023

Related U.S. Application Data

(63) Continuation of application No. PCT/US2021/047260, filed on Aug. 24, 2021.
(Continued)

(51) Int. Cl.
*G02B 6/44* (2006.01)
(52) U.S. Cl.
CPC .................. *G02B 6/448* (2013.01)

(58) Field of Classification Search
CPC ....................................................... G02B 6/448
(Continued)

(56) References Cited

U.S. PATENT DOCUMENTS

| 5,289,967 A | 3/1994 | Bampton et al. |
| 9,086,555 B2 | 7/2015 | Namazue et al. |

(Continued)

FOREIGN PATENT DOCUMENTS

WO 2022/046710 A1 3/2022

OTHER PUBLICATIONS

European Patent Application No. 21862531.7 Extended European Search Report dated Sep. 3, 2024; 5 Pages; European Patent Office.
(Continued)

*Primary Examiner* — Jerry M Blevins
(74) *Attorney, Agent, or Firm* — Thomas R. Irwin (57) ABSTRACT

Embodiments of the disclosure relate to an optical fiber ribbon. The optical fiber ribbon includes a plurality of subunits each comprising a subunit coating surrounding at least two optical fibers arranged adjacently to each other. The subunit coating is made of a first material. A plurality of bonds are intermittently formed between adjacent subunits of the plurality of subunits. The plurality of bonds are made of a second material. The optical fiber ribbon includes a diffusion zone at an interface between each of the plurality of bonds and the subunit coating of each adjacent subunit. Each diffusion zone has a gradient of the second material in the first material. Further, the intermittent bonds may include one or more saddle surfaces formed by intersecting convex and concave curvatures. A method of forming such optical fiber ribbons is also disclosed.

20 Claims, 12 Drawing Sheets

Related U.S. Application Data (60) Provisional application No. 63/072,429, filed on Aug. 31, 2020.

(58) Field of Classification Search
USPC .......................................................... 385/114
See application file for complete search history.

(56) References Cited

U.S. PATENT DOCUMENTS

| | | |
|---|---|---|
| 9,389,386 B2 | 7/2016 | Matsuzawa et al. |
| 9,541,722 B2 | 1/2017 | Sajima et al. |
| 9,739,965 B2 | 8/2017 | Isaji et al. |
| 9,766,397 B2 | 9/2017 | Homma |
| 9,880,368 B2 | 1/2018 | Debban et al. |
| 9,995,896 B2 | 6/2018 | Namazue et al. |
| 10,007,078 B2 | 6/2018 | Sato et al. |
| 10,488,609 B2 | 11/2019 | Sato et al. |
| 2002/0081084 A1 | 6/2002 | Matsumoto et al. |
| 2005/0058409 A1 | 3/2005 | Miao et al. |
| 2013/0156390 A1 | 6/2013 | Matsuzawa et al. |
| 2017/0031107 A1 | 2/2017 | Bringuier et al. |
| 2017/0090135 A1 | 3/2017 | Sato et al. |
| 2017/0219790 A1 | 8/2017 | Debban et al. |
| 2019/0022962 A1 | 1/2019 | Moriya et al. |
| 2019/0204519 A1 | 7/2019 | Sato et al. |
| 2019/0250347 A1 | 8/2019 | Fallahmohammadi et al. |
| 2019/0317289 A1 | 10/2019 | Sekine et al. |
| 2020/0081210 A1 | 3/2020 | Cignarale et al. |
| 2020/0271879 A1 | 8/2020 | Fallahmohammadi et al. |
| 2020/0292771 A1 | 9/2020 | Sekine et al. |
| 2022/0075134 A1* | 3/2022 | Sato .................. G02B 6/4403 |

OTHER PUBLICATIONS

International Search Report and Written Opinion of the International Searching Authority; PCT/US2021/047260; dated Nov. 30, 2021; 16 pages; United States Patent Office.

International Search Report and Written Opinion of the International Searching Authority; PCT/US2021/053322; dated Jan. 11, 2022; pp. 13; International Searching Authority.

\* cited by examiner

INTERMITTENTLY BONDED RIBBON WITH INTERMITTENT BONDS CREATED WITH A WET-ON-WET PROCESS

PRIORITY APPLICATION

This application is a continuation of International Patent Application No. PCT/US2021/047260 filed Aug. 24, 2021, which claims the benefit of priority to U.S. Provisional Application Ser. No. 63/072,429 filed on Aug. 31, 2020, the content of which is relied upon and incorporated herein by reference in its entirety.

BACKGROUND

The disclosure relates generally to optical fibers, and specifically to optical fiber ribbons in which the optical fibers are intermittently bonded together along the length of the optical fiber ribbon. A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or ribbons, may be color coded for the purposes of identification when making such connections. Further, the optical fiber cable may contain optical fibers arranged in ribbons to allow for multiple optical fibers to be fusion spliced together in a single operation. Arranging optical fibers into ribbons may lead to larger cable designs than if the optical fibers were loosely contained within the optical fiber cable.

SUMMARY

According to an aspect, embodiments of the disclosure relate to an optical fiber ribbon. The optical fiber ribbon includes a plurality of subunits each comprising a subunit coating surrounding at least two optical fibers arranged adjacently to each other. The subunit coating is made of a first material. A plurality of bonds are intermittently formed between adjacent subunits of the plurality of subunits. The plurality of bonds are made of a second material. The optical fiber ribbon includes a diffusion zone at an interface between each of the plurality of bonds and the subunit coating of each adjacent subunit. Each diffusion zone has a gradient of the second material in the first material.

According to another aspect, embodiments of the disclosure relate to method of preparing an optical fiber ribbon. In the method, a plurality of optical fibers are arranged adjacent to each other along a length of the optical fiber ribbon. A coating made of a first material is applied around sets of at least two optical fibers to create a plurality of subunits. Bonds made of a second material are intermittently applied between adjacent subunits of the plurality of subunits. The second material diffuses into the first material creating a diffusion zone of the second material in the first material. The first material and the second material are cured.

According to a further aspect, embodiments of the disclosure relate to an optical fiber ribbon. The optical fiber ribbon includes a plurality of subunits each having a subunit coating surrounding at least two optical fibers arranged adjacently to each other along a longitudinal axis of the optical fiber ribbon. The optical fiber ribbon also includes a plurality of bonds intermittently formed between adjacent subunits of the plurality of subunits. Each bond of the plurality of bonds has a first end, a second end, and a central region positioned along the longitudinal axis between the first end and the second end. At least one of the first end, the second end, or the central region of each bond includes at least one saddle surface comprising intersecting convex and concave curvatures.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an optical fiber ribbon having intermittent bonding regions between subunits as well as methods for producing such an optical fiber ribbon are provided. As described herein, the optical fiber ribbons according to the present disclosure are flexible such that the ribbons can be rolled, curled, folded, etc. from a planar configuration conventionally associated with fiber ribbons to a more space-saving configuration. In this way, the ribbons can be carried in cables having smaller diameters, and/or the cables can have a higher fiber density ratio (i.e., fraction of cross-sectional area filled with optical fibers relative to the outer cross-sectional area of the cable). As will be described below, the optical fiber ribbons include a plurality of fiber subunits, which have two or more optical fibers, that are intermittently bonded together along the length of the optical fiber ribbon. The intermittent bonds are applied with the subunit coating is uncured in a "wet-on-wet" process, which allows for diffusion of the intermittent bonding material into the subunit coating. The "wet-on-wet" process not only provides a more cohesive joint between the subunits but also enhances process efficiency by facilitating the "wetting" of the bonding material to the subunit coating and allowing the curing of the intermittent bond and subunit coating in a single step. Each of these exemplary embodiments will be described in greater detail below, and these exemplary embodiments are provided by way of illustration, and not by way of limitation. These and other aspects and advantages will be discussed in relation to the embodiments provided herein.

Figure 1:
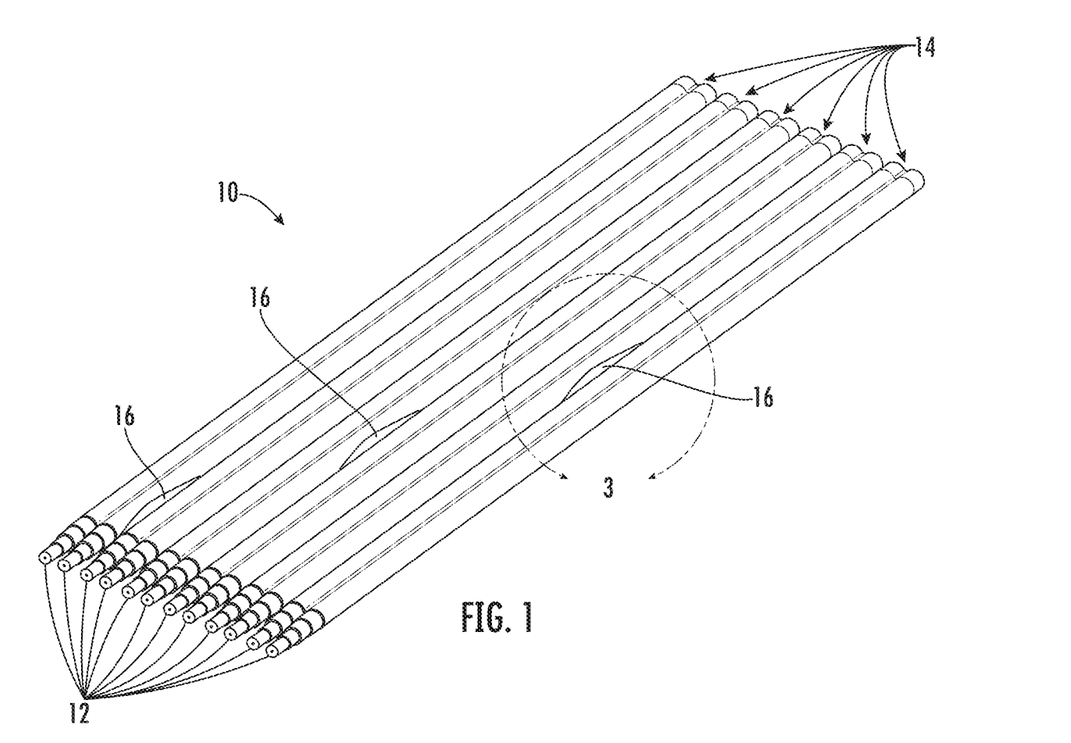
FIG. 1 is partial, perspective view of an intermittently bonded optical fiber ribbon, according to an exemplary embodiment.

FIG. 1 depicts an exemplary embodiment of an optical fiber ribbon 10 according to the present disclosure. The optical fiber ribbon 10 includes a plurality of optical fibers 12. In the embodiment depicted, the optical fiber ribbon 10 includes twelve optical fibers 12. In embodiments, the number of optical fibers 12 contained in the optical fiber ribbon 10 varies from, e.g., four to thirty-six. The optical fibers 12 are grouped into subunits 14 having two or more optical fibers 12. In the embodiment shown in FIG. 1, the subunits 14 each include two optical fibers 12. Thus, for example, in the embodiment of FIG. 1, the optical fibers 12 are arranged into six subunits 14. The optical fibers 12 of each subunit 14 are bonded to each other along the length of the optical fiber ribbon 10, but the subunits 14 are only intermittently bonded along the length of the optical fiber ribbon 10.

FIG. 1 depicts the intermittent bonds 16 staggered along the length of the subunits 14. The intermittent bonds 16 between two adjacent subunits 14 may be spaced apart by, e.g., 10 mm to 1000 mm. As will be discussed more fully below, the intermittent bonds 16 are applied in a "wet-on-wet" application process, which creates diffusion of the material of the intermittent bond 16 with the material joining the optical fibers 12 of the subunit 14. In embodiments, the optical fiber ribbon 10 has a first configuration in which the optical fibers 12 are arranged in a substantially planar row, which helps to organize the optical fibers 12 for mass fusion splicing. Further, as will be described more fully below, the subunits 14 also can be rolled, curled, or folded into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the subunits 14 are only held together intermittently along the length of the optical fiber 10 by the intermittent bonds 16.

In a conventional optical fiber ribbon, each optical fiber is bonded to its neighboring optical fiber(s) along the entire length of the optical fiber ribbon to hold them in the planar configuration. According to the present disclosure, however, the fiber subunits 14 are bonded intermittently along the length of the optical fiber ribbon 10 so that the optical fibers 12 are not rigidly held in the planar configuration. In between the intermittent bonds 16, the subunits 14 are not bonded to each other along their length. In this way, the present optical fiber ribbon 10 provides the advantages of a ribbon with respect to fiber organization and mass fusion splicing while also allowing the optical fiber ribbon 10 to curl, roll, or fold across the width for a more compact cable design.

Figure 2:
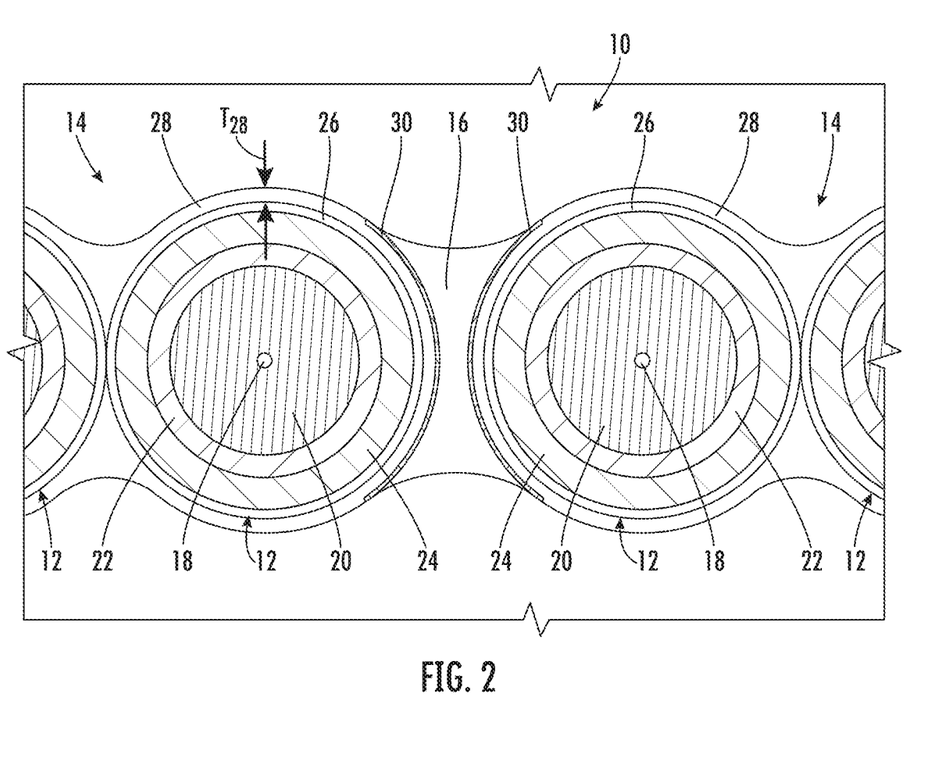
FIG. 2 depicts a partial cross-sectional view of a bond between two optical fiber subunits of the intermittently bonded optical fiber ribbon, according to another exemplary embodiment.

FIG. 2 depicts a cross-section of an intermittent bond 16 between subunits 14. As can be seen in the cross-section of FIG. 2, each optical fiber 12 includes a core 18 arranged substantially at the center of the optical fiber 12. Surrounding the core 18 is a cladding 20. An optical signal travels along the core 18 through internal reflection from the cladding 20. In embodiments, the cladding 20 is surrounded by a primary coating 22, which in turn may be surrounded by a secondary coating 24. The primary coating 22 and secondary coating 24 protect the core 18 and cladding 20. Further, in embodiments, the secondary coating 24 is surrounded by a color layer 26. The color layer 26 may be used to arrange the optical fibers 12 in a color-coded pattern. For example, one convention for color-coding the optical fibers 12 is to arrange them in the following color sequence: blue, orange, green, brown, slate, white, red, black, yellow, violet, rose, and aqua (going from upper left to lower right with respect to the orientation of FIG. 1). In embodiments containing more than twelve optical fibers 12, the pattern of colors may be repeated. The optical fibers 12 are color coded in this way to help organize and identify specific fibers 12 when making connections or splices.

As can be seen in FIG. 2, the optical fibers 12 of each subunit 14 are connected by a subunit coating 28. The subunit coating 28 joins the optical fibers 12 of each subunit 14 along their length. In embodiments, the optical fibers 12 in each subunit 14 may be touching or separated by a space of no more than one and a half times the diameter of the optical fibers 12 within the ribbon 10. Further, in embodiments, a gap between adjacent subunits 14 may be from 5 μm to 100 μm. At various intervals along the length of the optical fiber ribbon 10, intermittent bonds 16 are disposed in the gap between adjacent subunits 14. The intermittent bond 16 is applied prior to curing of the subunit coating 28, and the intermittent bond 16 and subunit coating 28 are cured together. As such, the intermittent bond 16 material and the subunit coating 28 material are both wet, i.e., uncured, when the intermittent bond 16 material is applied to the optical fiber ribbon 10. As shown in FIG. 2, this "wet-on-wet" application produces a diffusion zone 30 of the material of the intermittent bond 16 into the material of the subunit coating 28, and vice versa.

Outside of the diffusion zone 30, the material of the intermittent bond 16 has first properties, and the material of the subunit coating 28 has second properties. Within the diffusion zone 30, a gradient between the first properties and the second properties exists. In embodiments, the gradient of properties includes at least one of color, Young's modulus, surface friction, ultimate tear strength, or elongation at break, among others. Thus, for example, the material of the intermittent bond 16 may have a first Young's modulus, and the material of the subunit coating 28 may have a second Young's modulus that is greater than the first Young's modulus. In the diffusion zone 30, the Young's modulus will decrease from the second Young's modulus in a region of the subunit coating 28 just outside of the diffusion zone 30 to the first Young's modulus in a region of the intermittent bond 16 just outside of the diffusion zone 30. In embodiments, the gradient of the property in the diffusion zone 30 may be linear, exponential, geometric, etc. In embodiments, the diffusion zone 30 has a thickness of 2 μm to 50 μm, in particular, 5 μm to 15 μm.

In embodiments, formation of the diffusion zone 30 is facilitated by using miscible resins for the intermittent bond 16 material and the subunit coating 28 material. By using miscible resins, the material of the intermittent bond 16 will more readily mix with the material of the subunit coating 28. Further, besides miscibility, a relatively thicker diffusion zone 30 can be created using other material properties, such as reduced coating viscosities, to promote intermixing of the intermittent bond 16 and subunit coating 28 materials. In embodiments, the resin of the intermittent bond 16 may be immiscible in the resin of the subunit coating 28 but is at least not insoluble in the resin of the subunit coating 28, and in certain embodiments, the resin of the intermittent bond 16 is at least slightly soluble in the resin of the subunit coating 28. In embodiments, the diffusion zone 30 may also be characterized as providing a region of molecular entanglement between the material of the intermittent bond 16 and the material of the subunit coating 28. For example, the diffusion zone 30 may provide an interface between the intermittent bond 16 and subunit coating 28 in which a mechanical bond is created, e.g., as a result of microscopic mechanical surface undulations of the intermittent bond 16 and subunit coating 28.

Because the material of the intermittent bonds 16 mixes or entangles with the material of the subunit coating 28, significant adhesive/cohesive strength is provided at the location of the intermittent bond 16. During separation of the optical fibers 12 or subunits 14, any failure will either occur within one of the materials (depending on the cross-sectional area and cohesive strength of the material) or at an interface between the subunit coating 28 and the color layer 26.

The diffusion zone 30 distinguishes the presently disclosed intermittently bonded optical fiber ribbon 10 from other optical fiber ribbons that utilize "wet-on-dry" deposition techniques. In wet-on-dry deposition techniques, the coating layer to which the bonding material is applied is at least partially cured or fully cured. In this way, the "wet" bonding material does not have a chance to diffuse into or mix/entangle with the "dry" coating material to create a diffusion zone having a gradient of properties between those of the bonding material and those of the coating material.

Figure 3:
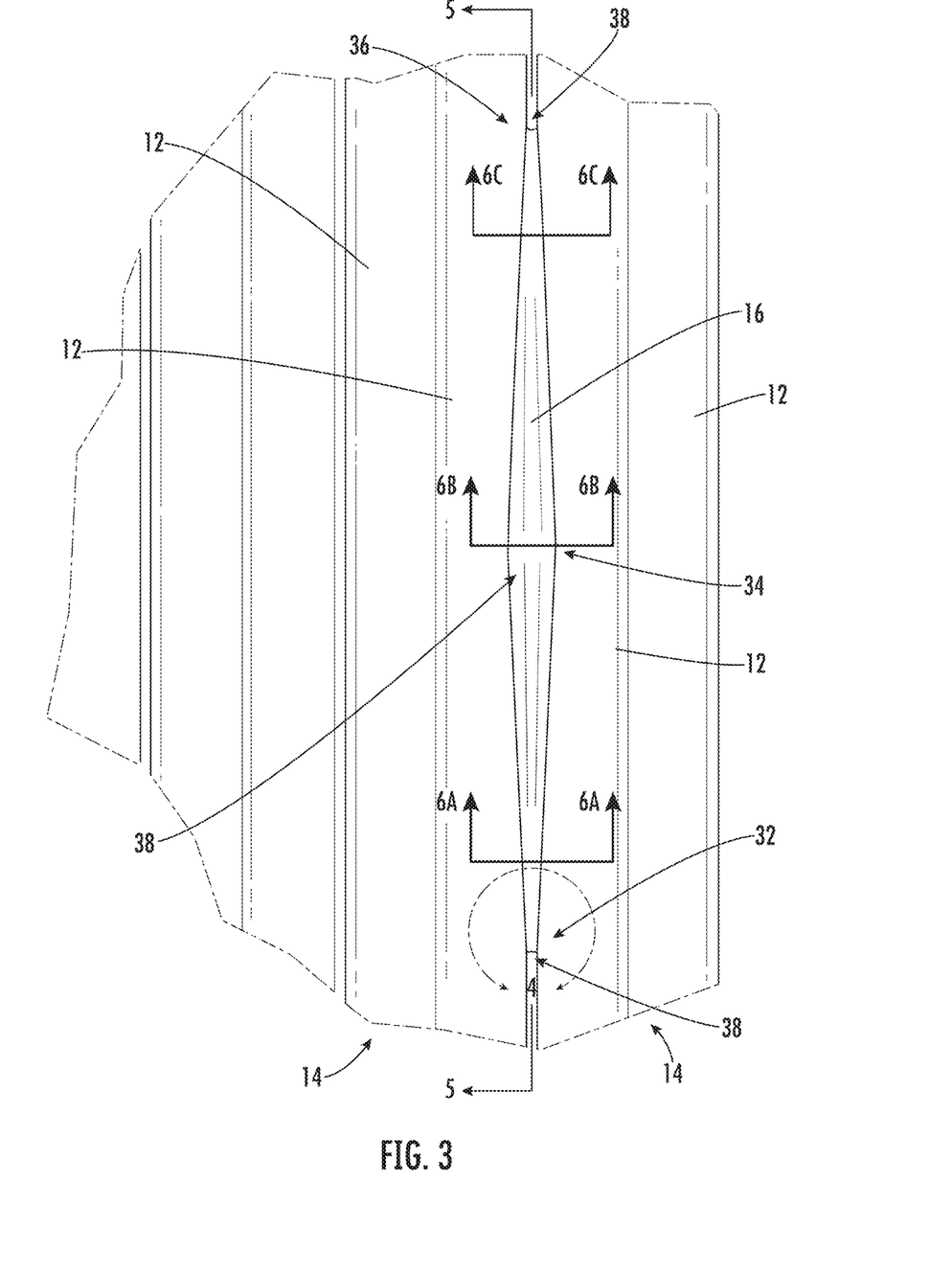
FIG. 3 depicts a top view of an intermittent bond of the optical fiber ribbon, according to an exemplary embodiment.
Figure 4:
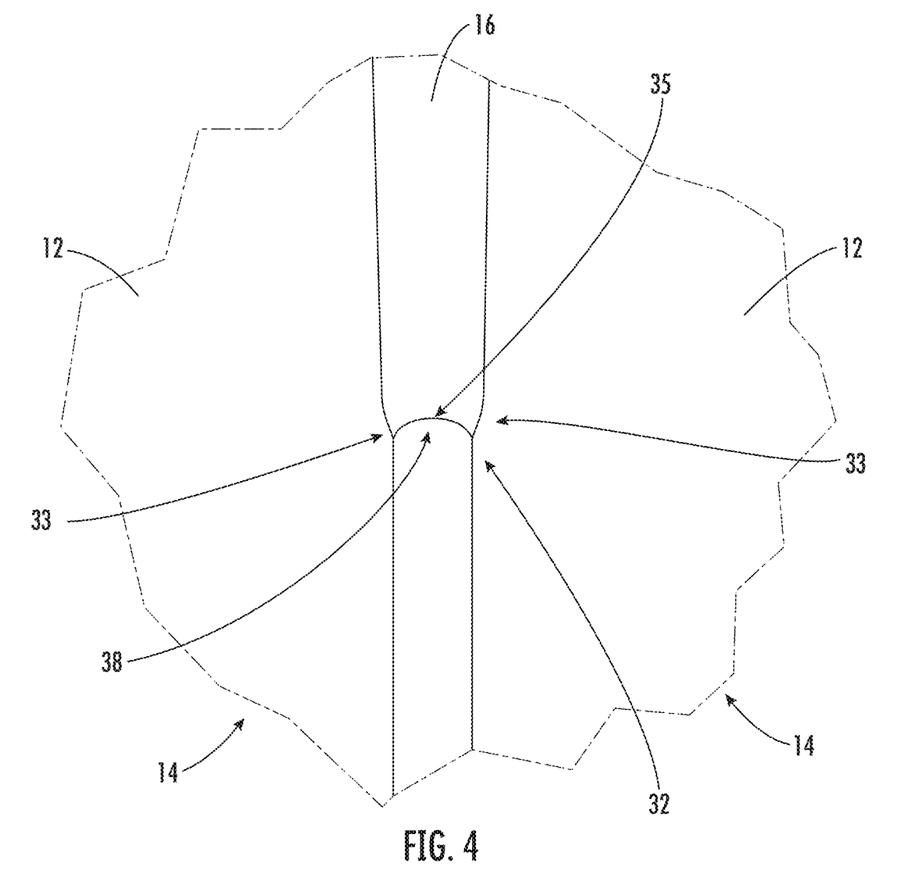
FIG. 4 depicts a saddle surface at an end of the intermittent bond, according to an exemplary embodiment.

Further, using the presently disclosed "wet-on-wet" process, the shape of the intermittent bond 16 also distinguishes the optical fiber ribbon 10 from other conventional optical fiber ribbons. Referring now to FIG. 3, a top view of an intermittent bond 16 between subunits 14 is shown. The intermittent bond 16 has a generally diamond-shaped outline in which a narrow first end 32 of the intermittent bond 16 widens to a maximum width in a central region 34 of the intermittent bond 16 and narrows again at a second end 36. Further, the surface of the intermittent bond 16 includes a plurality of saddle surfaces 38. As used herein, a "saddle surface" refers to a surface having intersecting convex and concave curvatures. In such an instance, the saddle surface may include at least one point ("saddle point") where the slopes in orthogonal directions are all zero, e.g., where a relative minimum and a relative maximum intersect at crossing axes. In embodiments, the intermittent bond 16 includes saddle surfaces 38 located at the first end 32, the second end 36, or both the first end 32 and the second end 36. As can be seen in the detail view of FIG. 4, the first end 32 has a concave curvature in which the edge portions 33 adjacent the optical fibers 12 extend past the middle portion 35. However, in the longitudinal cross-sectional view of FIG. 5, it can be seen that the middle portion 35 extends past a first (upper) surface 40 and a second (lower) surface 42 to define a convex curvature. Thus, in contrast to intersecting concave curvatures (which would define a bowl shape) and to intersecting convex curvatures (which would define a dome shape), the first end 32 defines a saddle surface 38. In embodiments, the second end 36 defines a saddle surface 38 in the same way as the first end 32, and the depiction of the first end 32 in FIG. 4 can be considered to apply as well to the second end 36.

Figure 5:
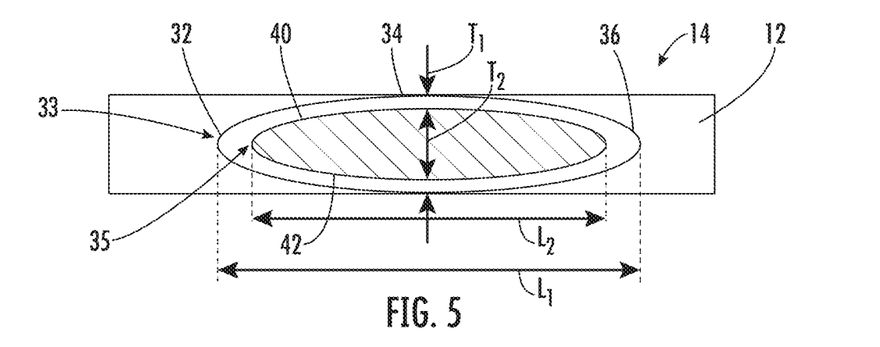
FIG. 5 depicts a cross-sectional view of the intermittent bond along the length of the intermittent bond, according to a further exemplary embodiment.

From the longitudinal cross-sectional view shown in FIG. 5, it can be seen that the first surface 40 and the second surface 42 define a changing thickness along the length of the intermittent bond 16. In particular, the thickness $T_1$ at the edge portions 33 increases moving from the first end 32 to the central region 34, and the thickness $T_1$ decreases moving from the central region 34 to the second end 36. Similarly, the thickness $T_2$ in the middle portion 35 increases moving from the first end 32 to the central region 34, and the thickness $T_2$ decreases moving from the central region 34 to the second end 36. In this way, the first surface 40 and the second surface 42 each define convex curvatures extending longitudinally along the length of the intermittent bond 16. However, as shown in the lateral cross-sections of FIGS. 6A-6C, the first surface 40 and the second surface 42 also define concave curvatures extending laterally across the width of the intermittent bond 16.

Figure 6A:
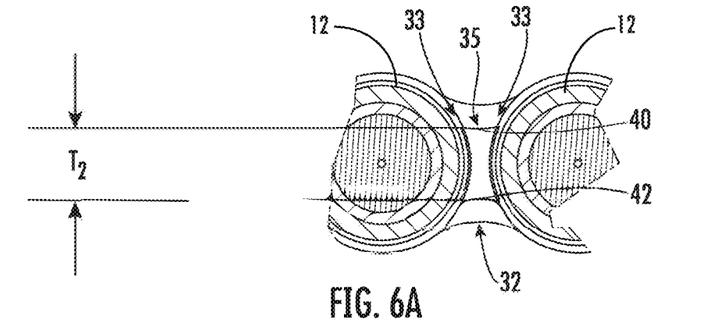
FIGS. 6A-6C depict cross-sectional views of the intermittent bond across the width of the intermittent bond, according to an exemplary embodiment.
Figure 6B:
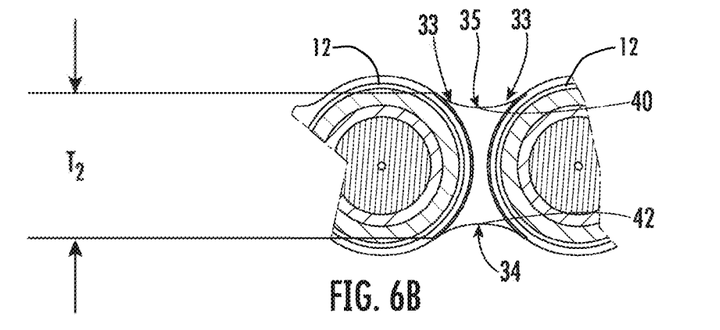
Figure 6C:
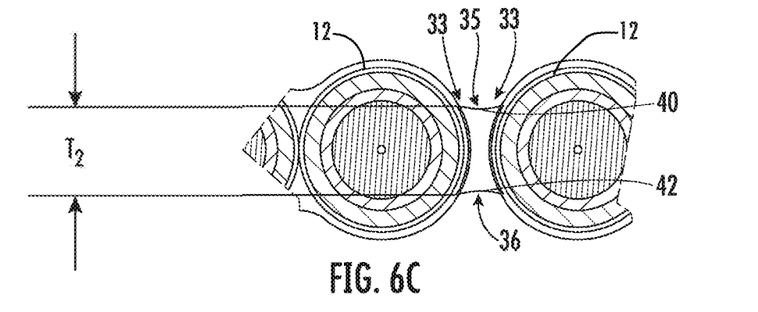

Referring first to FIG. 6A, a lateral cross-section taken proximal to the first end 32 is depicted. As can be seen, the edge portions 33 adjacent the optical fiber 12 on the first surface 40 are higher than the middle portion 35, and the edge portions 33 adjacent the optical fiber 12 on the second surface 42 are lower than the middle portion 35. FIG. 6B depicts a lateral cross-section taken at the central region 34. In comparison to FIG. 6A, the thickness $T_2$ of the intermittent bond 16 is increased in the cross-section of FIG. 6B, further demonstrating the longitudinal convex curvature (the thickness $T_1$ would also be increased but only one thickness is shown for the purpose of clarity). Additionally, in FIG. 6B, the edge portions 33 adjacent the optical fibers 12 are higher and lower than the middle portions 35 of the first surface 40 and second surface 42, respectively. Thus, the lateral cross-section demonstrates a concave curvature across the width of the intermittent bond 16. In FIG. 6C, a lateral cross-section taken proximal to the second end 36 is depicted. Again, it can be seen that the edge portions 33 adjacent the optical fiber 12 are higher and lower than the middle portions 35 of the first surface 40 and second surface 42, respectively.

Accordingly, in embodiments, the intermittent bond 16 can be described as having a variable lateral thickness in which a maximum lateral thickness is located at the edge portions 33 adjacent the optical fibers 12 of the subunits 14 and a minimum lateral thickness is located at the middle portion 35 proximal to a midpoint between the optical fibers 12 of the subunits 14. Further, in embodiments, the intermittent bond 16 can be described as having a variable longitudinal thickness in which a minimum longitudinal thickness is located at longitudinal ends 32, 36 of the intermittent bond 16 and a maximum longitudinal thickness is located proximal to a midpoint in the central region 34 between the longitudinal ends 32, 36 of the intermittent bond 16. Further, the variable thickness profile of the intermittent bond 16 may be described as a thin/thick/thin profile in which the surfaces 40, 42 will be concave in shape at every point about a plane bisecting the intermittent bond 16 in the lengthwise (i.e., longitudinal) direction.

Further, in embodiments and with reference to FIG. 5, the intermittent bond 16 can be described as having a maximum longitudinal length $L_1$ at edge portions 33 proximal to the optical fibers 12 of the subunits and a minimum longitudinal length $L_2$ at a middle portion 35 between the edge portions 33. Further, in embodiments and with reference to FIG. 3, the intermittent bond 16 can be described as having a minimum lateral width at the longitudinal ends 32, 36 of the intermittent bond 16 and a maximum lateral width in the central region 34 between the longitudinal ends 32, 36 of the intermittent bond 16.

Figure 7:
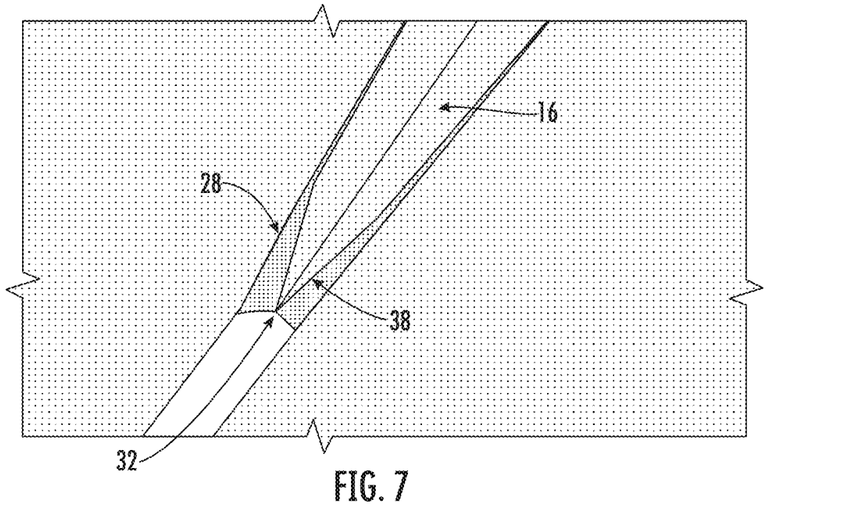
FIG. 7 depicts resin of the subunit coating drawn into a saddle surface at an end of the intermittent bond, according to an exemplary embodiment.

Because of the wet-on-wet application process, the material of the subunit coating 28 is drawn into the intermittent bond 16 at the ends 32, 36 as shown in FIG. 7. In particular, besides the diffusion zone 30 created at the interface between the intermittent bond 16 and the subunit coating 28, the subunit coating 28 is drawn into the gap between the subunits 28, enhancing mixing at the saddle surfaces 38 at the ends 32, 36. This is illustrated in FIG. 7 by the use of the first weight of stippling in the intermittent bond 16 and subunit coating 28 materials, and a heavier weight of stippling in the region where the subunit coating 28 material is drawn into the intermittent bond 16 material.

Figure 8:
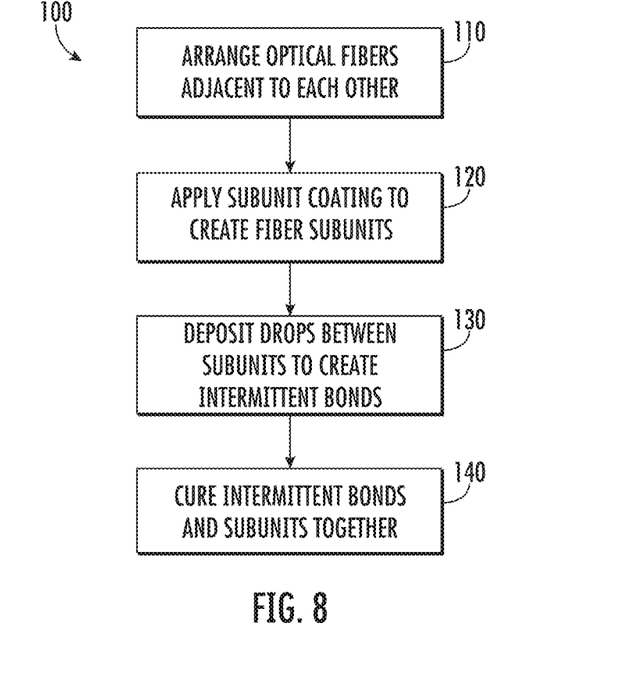
FIG. 8 is a flow diagram describing a method of preparing an optical fiber ribbon, according to an exemplary embodiment.

FIG. 8 depicts a process flow diagram for a method 100 for preparing an optical fiber ribbon 10 according to the present disclosure. In a first step 110, the optical fibers 12 are arranged adjacent to each other. For the purposes of processing and deposition of the subunit coating 28 and intermittent bonds 16, the optical fibers 12 may be arranged in a planar fashion. In a second step 120, the optical fibers 12 are moved through a continuous applicator that applies the material for the subunit coating 28. The material for the subunit coating 28 is applied in a manner that joins sets of at least two optical fibers 12 into fiber subunits 14.

In an embodiment, the material for the coating 16 is a curable formulation (e.g., UV-curable formulation) comprising one or more urethane acrylate oligomers, one or more epoxy acrylate oligomers, one or more acrylate monomers, one or more photoinitiators, an antioxidant, and/or other typical processing additives. Further, in embodiments, the material for the subunit coating 28 has a Young's modulus of from 25 MPa to 1300 MPa, an elongation at break of from 10% to 200%, a specific gravity of 0.9 to 1.2, a tensile strength of 10 MPa to 40 MPa, and/or a viscosity in the range from 100 cP to 8000 cP at 25° C. Additionally, in embodiments, the material for the intermittent bonds 16 has a glass transition temperature of from 30° C. to 100° C.

The subunit coating 28 is applied in a continuous manner so as to provide a lengthwise continuous coating 28 for the two (or more) optical fibers 12 in the subunit 14. Referring back to FIG. 2, it can be seen that the subunit coating 28 has a variable thickness around the optical fibers 12. In embodiments, the subunit coating 28 is applied in such a way that the subunit coating 28 has a minimum thickness $T_{28}$ (as shown in FIG. 2) of 2 μm to 20 μm. The minimum thickness $T_{28}$ will generally be located at or proximal to the positions around the optical fiber 12 normal to a plane defined by the adjacent optical fibers 12 of the subunit 14.

Before curing the subunit coating 28, the intermittent bonds 16 are deposited between the subunits 14 in a third step 130. In embodiments, the material of the intermittent bonds 16 is applied in a dropwise fashion. In particular, the intermittent bonds 16 may be deposited using a discrete coating applicator that ejects a droplet of liquid material for the intermittent bonds 16 onto the uncured and still wet subunit coating 28. As mentioned above, the subunits 14 are spaced such that a gap of 5 μm to 100 μm is provided between the subunits 14, and the intermittent bond 16 bridges the gap between the subunits 14. The shape of the intermittent bond 16 can be influenced by the viscosity of the material deposited, e.g., a lower viscosity can enhance mixing and increase the thickness of the diffusion zone and also cause more spread of the droplet. Thus, in embodiments, the discrete coating applicator may operate in conjunction with a heating element to adjust the viscosity to influence the shape of the intermittent bonds 16. Additionally, the discrete coating applicator may be adjusted to vary the volume of the droplet to increase or decrease the length or width of the intermittent bond 16. In embodiments, manipulating the volume, length and/or width of the intermittent bond 16 can affect the tear strength required to disrupt the intermittent bonds 16, e.g., when installing the optical fiber ribbon 10.

Figure 9:
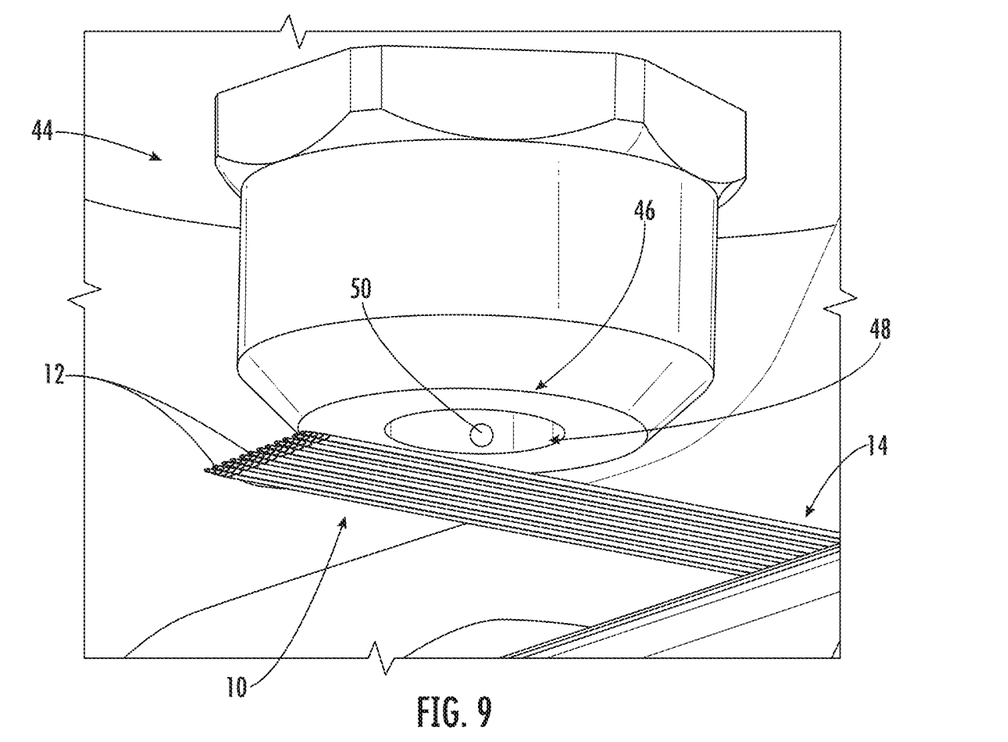
FIG. 9 depicts a discrete coating applicator configured to deposit the intermittent bonds, according to an exemplary embodiment.

FIG. 9 depicts an embodiment of a discrete coating applicator 44. The applicator 44 includes a nozzle 46 having an aperture 48 through which a droplet 50 of intermittent bond 16 material is ejected. The droplet 50 may be ejected using a plunger actuated by a controller. In embodiments, the applicator 44 may move across the width of the ribbon 10 to deposit each intermittent bond 16. In other embodiments, a plurality of applicators 44 may be provided to deposit droplets 50 between specific subunits 14. For example, an optical fiber ribbon 10 having twelve optical fibers 12 will have six subunits 14 having five gaps between the subunits 14 to be filled with droplets 50 to form the intermittent bonds 16. Thus, five applicators 44 may be provided across the width of the optical fiber ribbon 10 to deposit the intermittent bonds 16. In practice, the optical fibers 12 will be moving along a processing line, and the applicator 44 or applicators 44 will be located at a station on the processing line. Thus, the applicator(s) 44 will apply droplets 50 on moving optical fibers 12.

In an embodiment, the material of the intermittent bonds 16 is a curable formulation (e.g., UV-curable formulation) comprising one or more urethane acrylate oligomers, one or more epoxy acrylate oligomers, one or more acrylate monomers, one or more photoinitiators, an antioxidant, and/or other typical processing additives. Further, in embodiments, the material for the intermittent bonds 16 has a Young's modulus of from 25 MPa to 1300 MPa, an elongation at break of from 100% to 500%, preferably from 100% to 200%, a specific gravity of 0.9 to 1.2, a tensile strength of 10 MPa to 40 MPa, and/or a viscosity in the range from 100 cP to 8000 cP at 25° C. Additionally, in embodiments, the material for the intermittent bonds 16 has a glass transition temperature of from 20° C. to 100° C.

Returning to FIG. 8, in a fourth step 140, the subunit coating 28 and intermittent bond 16 are cured together. In embodiments, curing can involve application of various forms of radiation, such as ultraviolet (UV) light, visible light, infrared (IR) radiation. Additionally, curing can involve application of heat or water vapor. As with the applicators 44, the optical fibers 12 will generally be moving along a processing line, and thus, the curing make take place, e.g., within a chamber that is another station along the processing line downstream from the applicator 44 station.

Figure 10:
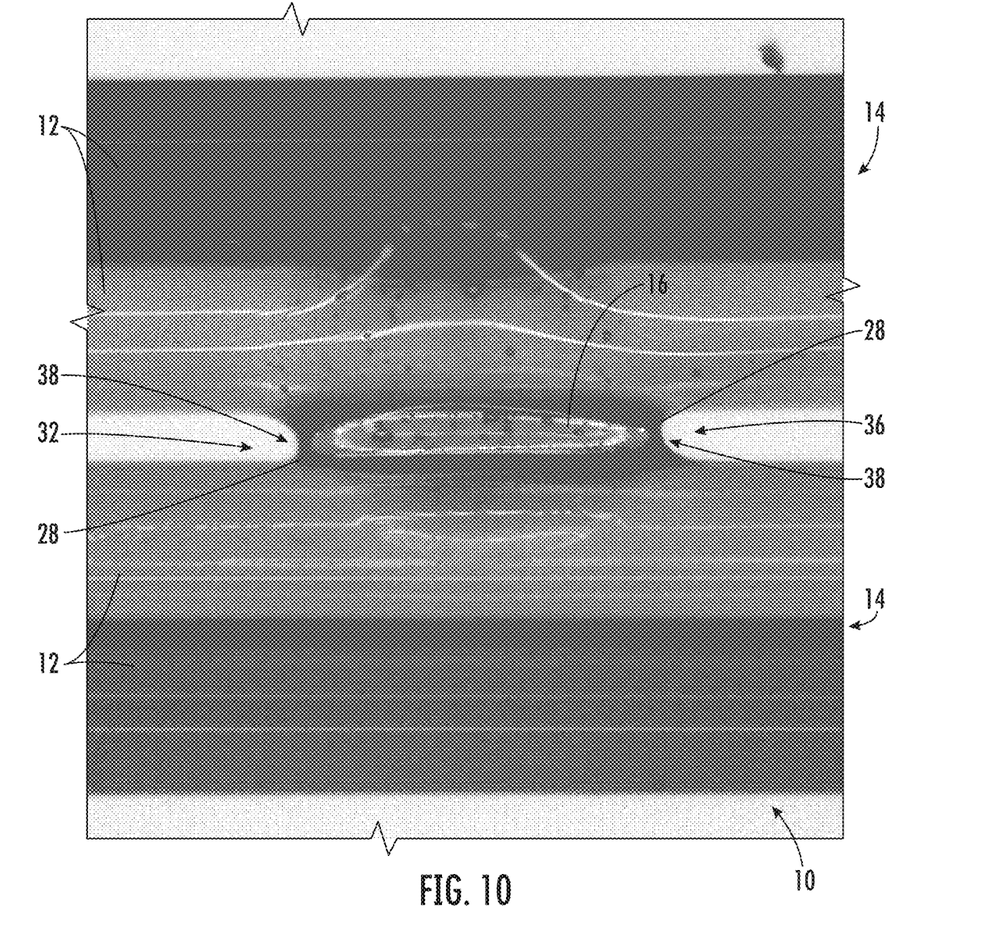
FIG. 10 depicts an intermittent bond deposited between subunits, according to an exemplary embodiment.
Figure 11:
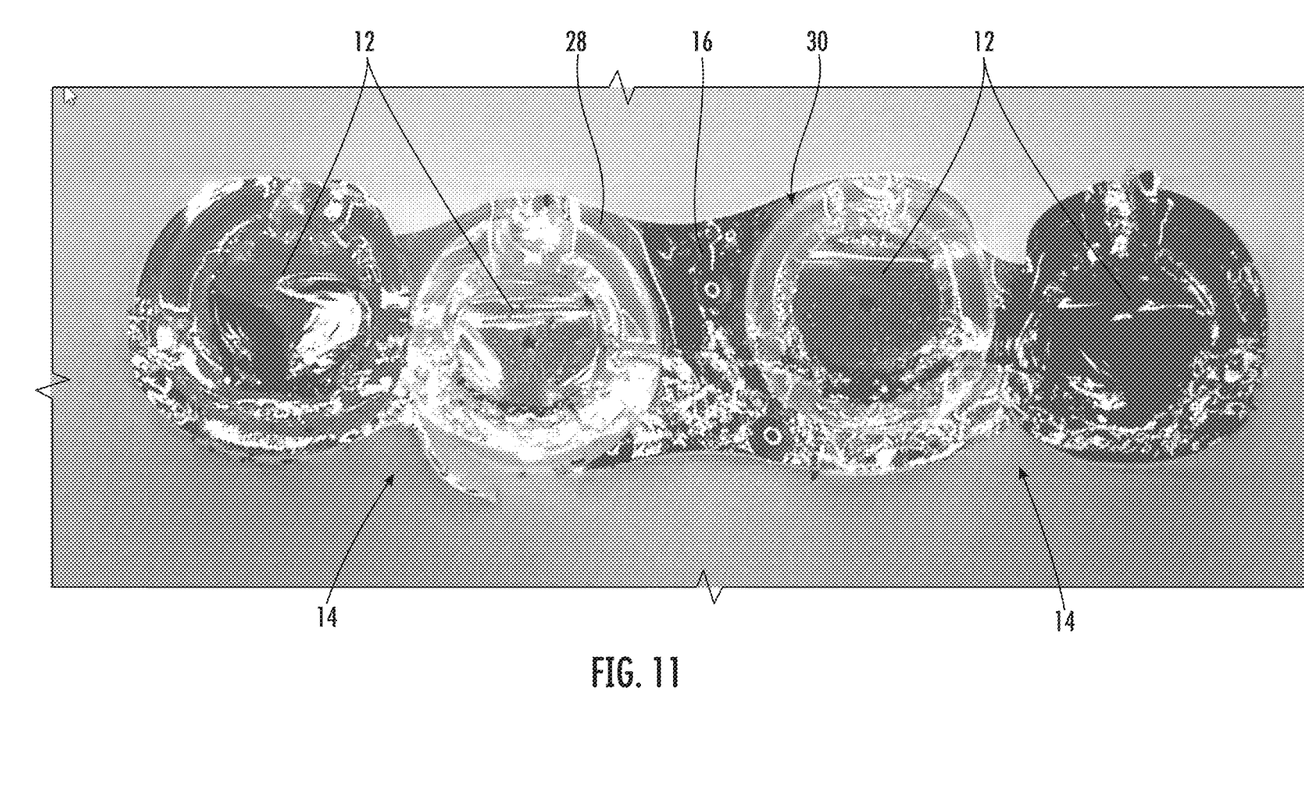
FIG. 11 depicts a cross-section of the intermittent bond of FIG. 10.

FIG. 10 depicts an intermittent bond 16 between adjacent subunits 14 of an optical fiber ribbon 10 prepared using the method 100 described above. The saddle surfaces 38 can be seen at the ends 32, 36 of the intermittent bond 16. Further, it can be seen in FIG. 10 that the subunit coating 28 is drawn into the ends 32, 36 of the intermittent bond 16 at the saddle surfaces 38. FIG. 11 depicts a section taken across the width of the subunits 14 shown in FIG. 10. FIG. 11 demonstrates the profile of the intermittent bond 16 in which the thickness is decreased at the midpoint of the intermittent bond 16 between the subunits 14 as compared to the thickness adjacent to the subunits 14. Additionally, FIG. 11 depicts the diffusion zone 30 between the subunit coating 28 and the intermittent bond 16.

Figure 12:
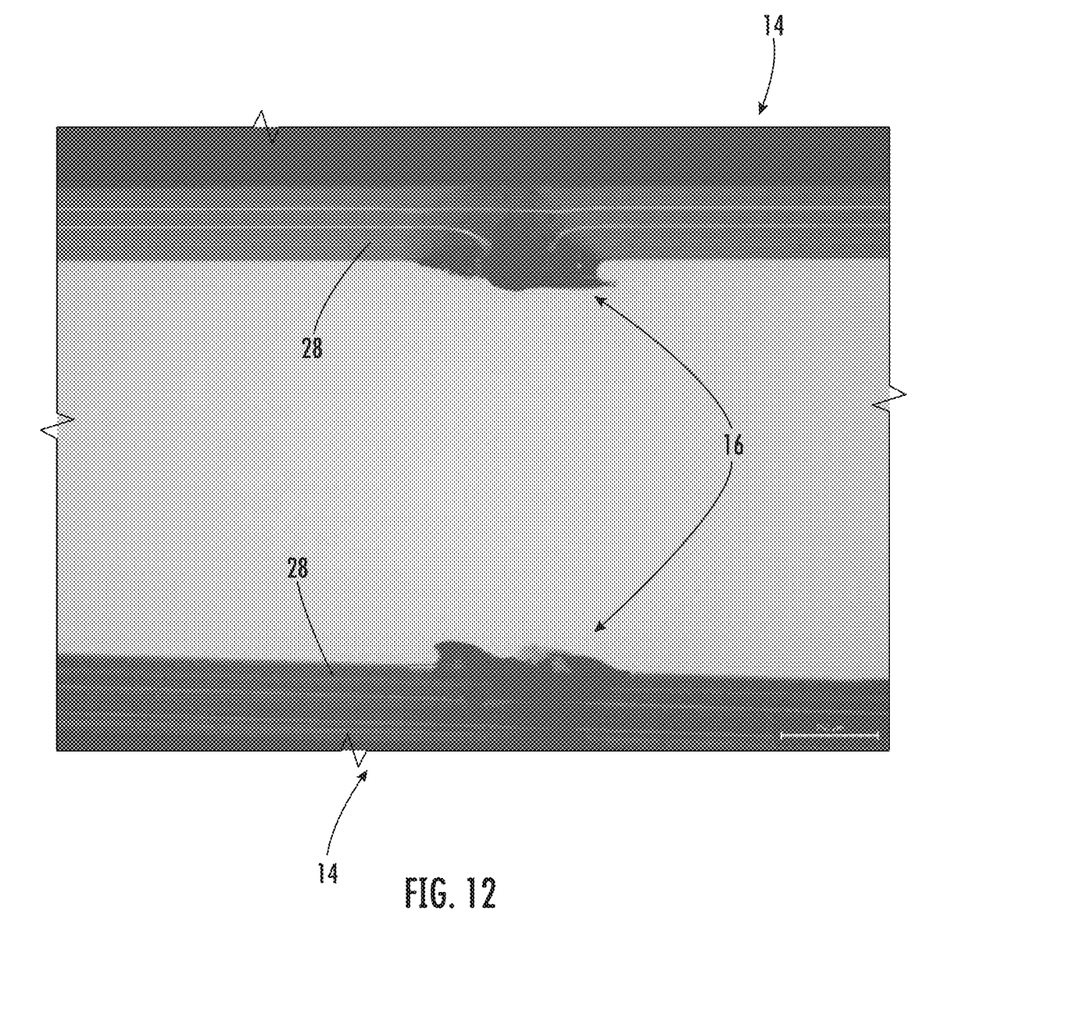
FIGS. 12 and 13 depict breakage of the intermittent bond, according to exemplary embodiments.
Figure 13:
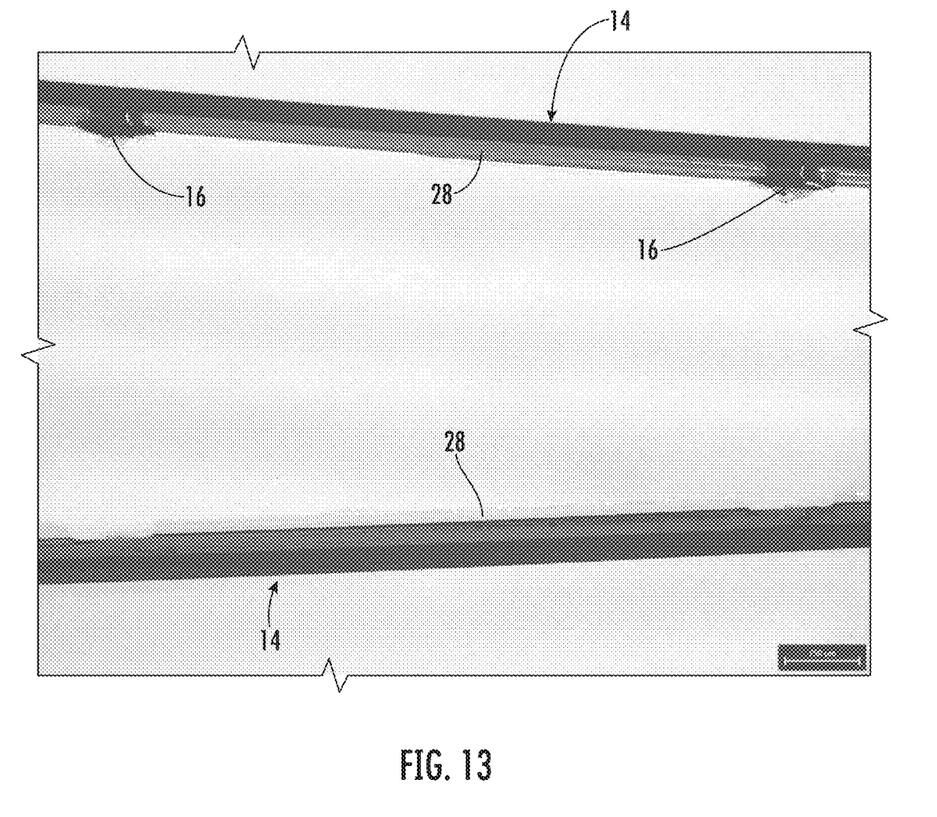

FIGS. 12 and 13 depict different breakages of the intermittent bond 16 when pulled apart. FIG. 12 depicts a cohesive failure of the intermittent bond 16. That is, the point of failure was located within the intermittent bond 16 itself instead of at an interface between the subunit coating 28 and the intermittent bond 16. In embodiments, the cohesive failure of the intermittent bond 16 occurs at a force of 0.2 gf to 75 gf, preferably from 1 gf to 35 gf, as measured according to a T-peel test in which the ends of adjacent subunits 14 are pulled in opposite directions until the intermittent bond 16 breaks (see, e.g., Method G5 for ribbon tear (separability) in IEC 60794-1-23: 2019). As mentioned above, the intermittent bond 16 allows the subunits 14 to operate like an optical fiber ribbon 10 while also providing the fiber density advantages of loose tube fibers. When installing the optical fibers 12, the subunits 14 may need to be separated in order to route the optical fibers appropriately. Thus, breakage of the intermittent bond 16 is built into the design of the intermittent bond 16. Further, as discussed above, the length and/or width of the intermittent bond can be manipulated to provide a greater or lower breaking strength. Still further, the materials of the intermittent bond 16 and/or subunit coating 28 can be manipulated to provide a desired breaking strength. In that regard, FIG. 13 depicts an adhesive failure in which the intermittent bond 16 separates from the subunit 14. In practice, the breakage may be the result of a combination of adhesive and cohesive failure in view of the diffusion zone 30 in which the materials of the subunit coating 28 and of the intermittent bond 16 are mixed.

Figure 14:
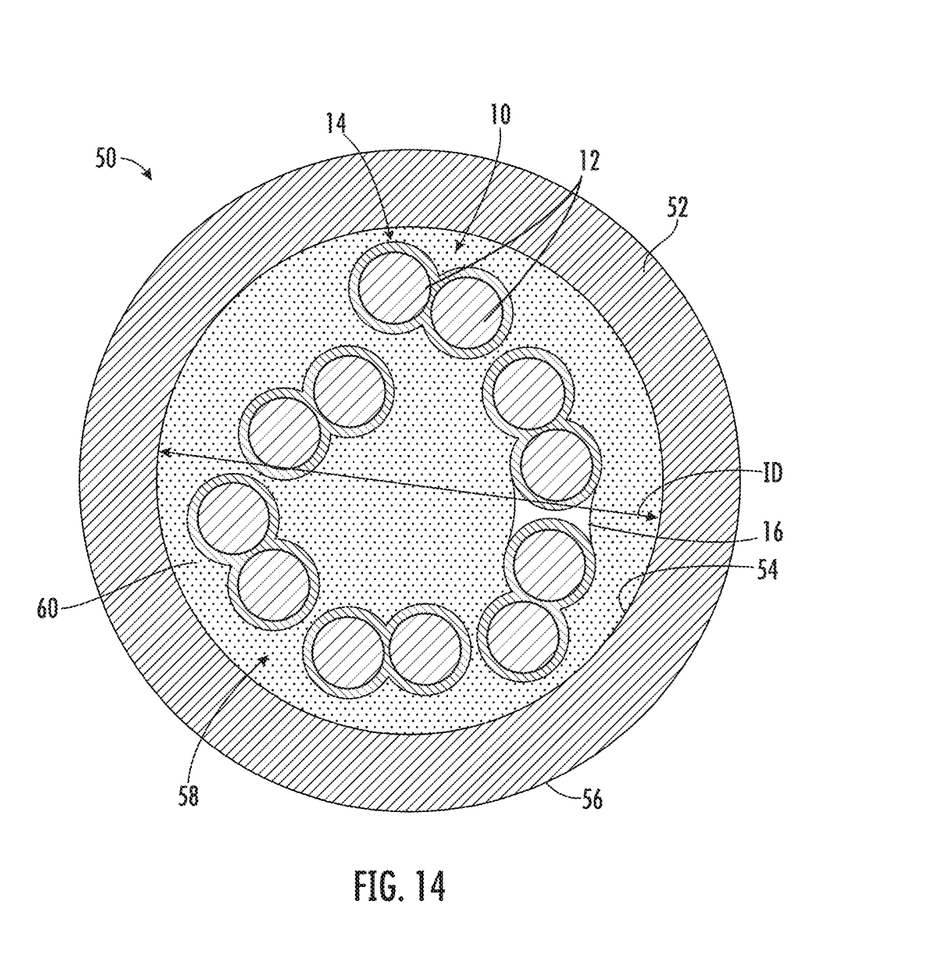
FIG. 14 depicts an optical fiber cable including the intermittently bonded optical fiber ribbon, according to an exemplary embodiment.

As mentioned above, the intermittently bonded optical fiber ribbon 10 allows for smaller cable diameters and/or higher fill ratios. FIG. 14 depicts an exemplary embodiment of an optical fiber cable or buffer tube 50 containing an intermittently bonded optical fiber ribbon 10. The optical fiber cable 50 has a cable jacket 52 with an inner surface 54 and an outer surface 56. The inner surface 54 defines a central bore 58 containing the optical fiber ribbon 10. The central bore 58 has a diameter, which is the inner diameter ID of the cable jacket 52. As shown in FIG. 14, the central bore 58 is also filled with filling material 60, which may be, e.g., strength members (such as aramid, cotton, basalt, and/or glass yarns), water blocking gels or powders, and/or fire retardant materials, among others.

Conventionally, the inner diameter of the cable jacket had to be at least as large as the width of the optical fiber ribbon in the planar configuration in order to accommodate the entire optical fiber ribbon. However, this meant that much of the interior space of the optical fiber jacket went unfilled. According to the present disclosure, smaller cable diameters and/or higher fiber density ratios are achievable by reducing the maximum cross-sectional dimension of the optical fiber ribbon 10. In particular, by rolling, curling, or folding the optical fiber ribbon 10 into, e.g., a circle or spiral, the inner diameter ID of the cable 50 can be smaller, providing an overall smaller and more densely filled cable design. Notwithstanding, the optical fiber ribbon 10 can still be removed from the optical fiber cable 50, flattened into the planar configuration, and then easily be mass fusion spliced like a conventional optical fiber ribbon. For the sake of simplicity, a single optical fiber ribbon 10 was shown in the optical fiber cable 50. However, in other embodiments, the optical fiber cable 50 may contain several tens or hundreds of optical fiber ribbons 10. Further, such optical fiber ribbons 10 may be arranged in one or more buffer tubes within the central bore 58 of the cable jacket 52.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:
   a plurality of subunits each comprising a subunit coating surrounding at least two optical fibers arranged adjacently to each other, the subunit coating comprising a first material;
   a plurality of bonds intermittently formed between adjacent subunits of the plurality of subunits, the plurality of bonds comprising a second material; and
   a diffusion zone at an interface between each of the plurality of bonds and the subunit coating of each adjacent subunit;
   wherein each diffusion zone comprises a gradient of the second material in the first material.

2. The optical fiber ribbon of claim 1, wherein each diffusion zone has as thickness of 2 µm to 50 µm.

3. The optical fiber ribbon of claim 1, wherein the second material comprises at least one of a Young's modulus from 25 MPa to 1300 MPa, an elongation at break from 100% to 200%, a specific gravity of 0.9 to 1.2, a tensile strength of 10 MPa to 40 MPa, a viscosity in the range from 100 cP to 8000 cP at 25° C., or a glass transition temperature of 20° C. to 100° C.

4. The optical fiber ribbon of claim 1, wherein the first material comprises at least one of a Young's modulus of 25 MPa to 1300 MPa, an elongation at break of 10% to 200%, a specific gravity of 0.9 to 1.2, a tensile strength of 10 MPa to 40 MPa, a viscosity in the range from 100 cP to 8000 cP at 25° C., or a glass transition temperature of 30° C. to 100° C.

5. The optical fiber ribbon of claim 1, wherein the first material is miscible in the second material.

6. The optical fiber ribbon of claim 1, wherein each of the plurality of bonds comprises at least one saddle surface.

7. The optical fiber ribbon of claim 6, wherein each bond comprises a first end, a second end, and a central region disposed between the first end and the second end and wherein the at least one saddle surface comprises a first saddle surface located at the first end of the bond.

8. The optical fiber ribbon of claim 7, wherein the subunit coating is drawn into the first saddle surface.

9. The optical fiber ribbon of claim 7, wherein the at least one saddle surface comprises a second saddle surface located at the second end of the bond or at the central region of the bond.

10. The optical fiber ribbon of claim 1, wherein each of the plurality of bonds breaks at a force of 0.2 gf to 75 gf as measured according to a T-peel test.

11. A method of preparing an optical fiber ribbon, comprising:
   arranging a plurality of optical fibers adjacent to each other along a length of the optical fiber ribbon;
   applying a coating comprising a first material around sets of at least two optical fibers to create a plurality of subunits;
   intermittently applying bonds comprising a second material between adjacent subunits of the plurality of subunits, wherein the second material diffuses into the first material creating a diffusion zone of the second material in the first material;
   curing the first material and the second material.

12. The method of claim 11, wherein the step of intermittently applying bonds further comprises depositing droplets of the second material between the adjacent subunits of the plurality of subunits.

13. The method of claim 11, wherein the second material is miscible in the first material.

14. The method of claim 11, wherein the diffusion zone has a thickness of 2 μm to 50 μm.

15. The method of claim 11, wherein the first material comprises a first property and the second material comprises a second property and wherein the diffusion zone comprises a gradient between the first property and the second property.

16. The method of claim 15, wherein the first property and the second property each comprise at least one of color, Young's modulus, surface friction, ultimate tear strength, or elongation at break.

17. The method of claim 11, wherein the bonds each comprise at least one saddle surface and wherein the step of intermittently applying the bonds draws the first material of the coating into the saddle surface.

18. An optical fiber ribbon, comprising:
   a plurality of subunits each comprising a subunit coating surrounding at least two optical fibers arranged adjacently to each other along a longitudinal axis of the optical fiber ribbon; and
   a plurality of bonds intermittently formed between adjacent subunits of the plurality of subunits;
   wherein each bond of the plurality of bonds comprises a first end, a second end, and a central region positioned along the longitudinal axis between the first end and the second end;
   wherein at least one of the first end, the second end, or the central region of each bond comprises at least one saddle surface comprising intersecting convex and concave curvatures, and
   wherein the subunit coating comprises a first material, wherein each bond of the plurality of bonds comprises a second material, and wherein the optical fiber ribbon further comprises a diffusion zone at an interface between each bond of the plurality of bonds and the subunit coating of the adjacent subunits of the plurality of subunits between which the bond is formed, the diffusion zone comprising a gradient of the second material in the first material.

19. The optical fiber ribbon of claim 18, wherein the diffusion zone has as thickness of 2 μm to 50 μm.

20. The optical fiber ribbon of claim 18, wherein a first bond in the bonds exhibits cohesive failure when subjected to a force of 0.2 gf to 75 gf as measured according to a T-peel test.

* * * * *